Figure 1:
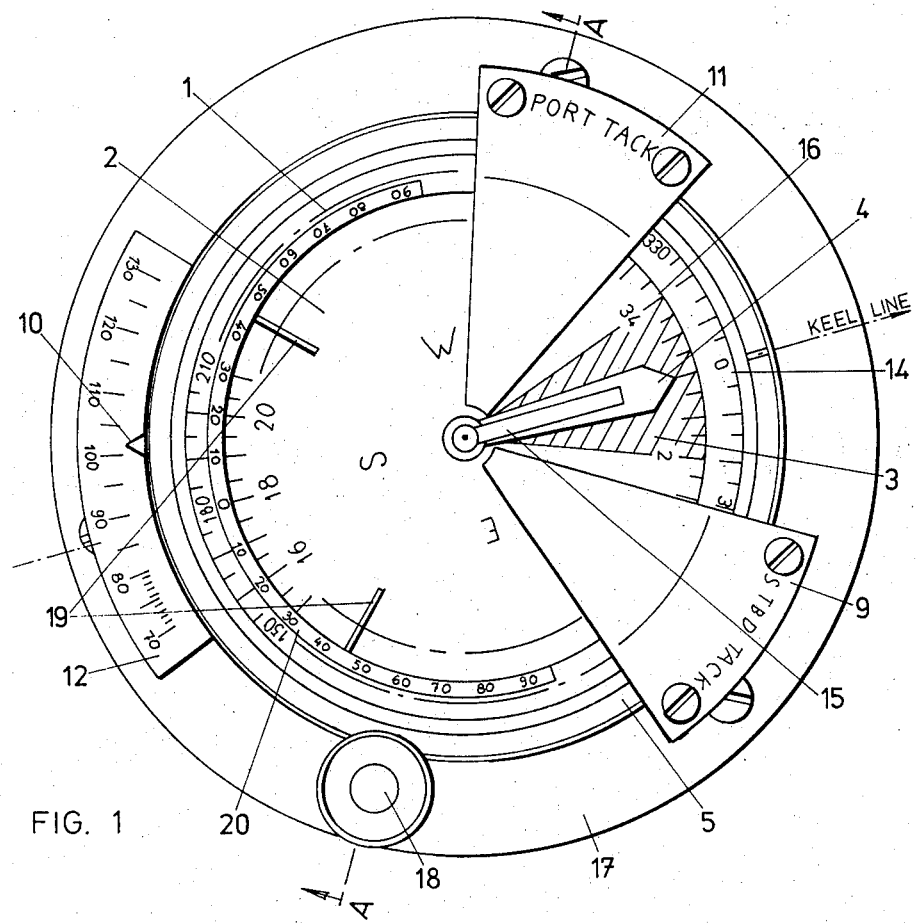

United States Patent [19]
Honkaranta et al.

[11] 3,824,947
[45] July 23, 1974

[54] COMPASS DEVICE FOR SAILING

[75] Inventors: Reijo Honkaranta, Espoo; Kauko Jarvenpaa, Helsinki, both of Finland; Kevin Shephard, Wollstonecraft, Australia

[73] Assignee: Suunto Oy, Vanhakartano, Finland

[22] Filed: July 17, 1972

[21] Appl. No.: 272,527

[52] U.S. Cl................ 116/114 R, 33/349, 73/180, 116/133
[51] Int. Cl.......................................... G01d 21/00
[58] Field of Search............... 116/114 R, 129, 133; 33/349, 355, 272, 363; 73/180, 188, 189

[56] References Cited
UNITED STATES PATENTS

| | | | |
|---|---|---|---|
| 290,840 | 12/1883 | Blakeslee | 73/180 |
| 2,303,990 | 12/1942 | Dietz | 33/349 |
| 3,664,292 | 5/1972 | Sherman | 116/114 R |

Primary Examiner—Louis J. Capozi
Attorney, Agent, or Firm—Richards & Geier and V. Alexander Scher

[57] ABSTRACT

A compass device for use in sailing, which has a compass frame mountable in the sailcraft and comprising a compass card box provided with a main steering index and, outside this box external indexes which are called tack indexes. The invention is particularly characterized by the features that the compass card carries a tacking index and that said tack indexes are turnable about the center of the card box to make the central angle enclosed by them to be consistent with the vessel's angle of ascent, and that said tack indexes may be set so that the tacking index on the card becomes centered in the angle between them. Further, optional, characteristic features concern the provision on the card box of further, so-called scud indexes and their location, certain preferable arrangements for securing the positions of various indexes, and the coloring and other details of design of the indexes.

6 Claims, 2 Drawing Figures

PATENTED JUL 23 1974 3,824,947

COMPASS DEVICE FOR SAILING

The present invention concerns a compass device, consisting of a compass frame mountable in a vessel and comprising a compass card box provided with a main steering index and, outside this box, steering indexes, so-called tack indexes. In sailing, particularly in yacht-racing, it is necessary when tacking to steer the vessel so that its angle of ascent is the most favourable on both legs of the tack. In other words, the vessel should be steered under such an angle to the wind that the rate of displacement in the direction of travelling is the highest possible. The most favourable ascent angle varies with different vessels and according to fittings and conditions. In order to maintain a given ascent angle which has been found to be favourable, a compass may be used which has been specifically designed for the purpose. It is known practice to use a compass having fixed steering indexes, so-called tack indexes, disposed on either side of the keel line and at equal angles with reference to it. As a rule, said fixed steering indexes have been placed at an angle of 45°. At tacking, the compass reading, in degrees, of the direction of travel is kept under one or the other of the steering indexes, depending on which leg is being traversed. If the most favourable ascent angle of the vessel differs from the angle at which the fixed steering indexes have been placed, this deviation is correspondingly taken into account in the compass setting for both legs. This correction may be applied to the compass reading by calculation or it may be visually estimated.

A compass of the kind described, as well as other types of compass intended for sailing, are not fit to be used under circumstances in which the geographical wind direction is variable. Even within a short period the wind direction may change so as to appreciably influence the tack bearings with reference to the direction of travel and, also, the relative lengths of the tacking legs with reference to each other. Endeavours have been made to follow the changes in wind direction by observing a vane on the mast, or another object sensitively assuming the direction of the wind. It has been attempted to estimate the change thus observed and to take it into account when the tacking bearings and lengths of tacking legs are determined. Another practice is to maintian the vessel in accordance with the indication of such vane devices at the most favourable angle of ascent with reference to the wind and to read from the compass the change of the vessel's geographical bearing, on the basis of which the mutual relative lengths of the legs are changed to be the most favourable ones. The latter procedure is more accurate, but it requres continuous memorizing of compass readings and performing of correction calculations, regulating the vane, etc. Steering indexes on the compass are of little avail when sailing before the wind, and even at tacking their use merely provides estimated, rough tacking bearings, or otherwise it is necessary to apply calculations of the bearing angles, which are time-consuming ahd highly susceptible to error, especially under sailing conditions.

The aim of the present invention is to provide a compass which elimiates in the art of sailing the drawbacks outlined above. The invention is particularly characterized in that the compass card carries a tacking index and that on the outside of the card box the tack indexes are turnable about the centre of the card box in order that it is possible to set the central angle between them to be consistent with the angle of ascent of the vessel and to place said tack indexes so that the tacking index on the card will lie centrally in the angle between the second tack indexes. It is thus understood that the angle enclosed by the tack indexes can be made to have any currently desired magnitude and that changes in wind direction can be easily followed. It is advantageous if furthermore the compass has on its card box at least two so-called scud indexes, which are found on the side of the card box opposite to that where the main steering index is located. The tack indexes have most appropriately been attached each to its own turning member turnable about the card box, and to one of these turning members a reading index has been attached and to the other, an angle of ascent graduation. The tacking index on the compass card may be sector-shaped and the tack indexes extending over the card box may be similar, and preferably the colour of the turnable tack indexes and that of the tacking index on the card are complementary colours.

The invention is described in greater detail with reference to the embodiment example presented in the attached drawing. In the drawing, FIG. 1 shows a compass device according to the invention, as viewed from above.

Figure 2:
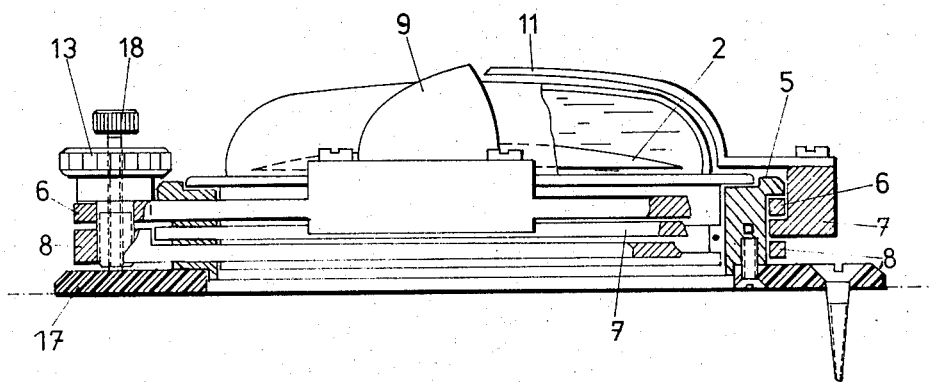

FIG. 2 shows the same compass device, but in section along the line A—A in FIG. 1.

The compass comprises a frame piece 17 mountable in the vessel, a compass card 2 and a compass card box 1 turnable about its centre, this box consisting of transparent material, such as plastic. The card box 1 is turnable within the guiding ring 5. The reference numeral 16 indicates the graduation of the turnable card box. The card 2 carries a sector-shaped, red tacking index of the card 3. The reference numeral 4 indicates the north index on the card. The compass also comprises two tack indexes 9 and 11, which are transparent and green, which is the complementary colour to the red colour of the tacking index 3 on the card. The card box is surrounded by two turnable annular turning members 6 and 7. To the upper turning member one tack index 9 and the reading index 10 have been affixed. To the lower turning member the other tack index 11 and the ascent angle graduation 12 have been affixed. The reference numeral 8 indicates an auxiliary element, which is turnable similarly as the turning members 6 and 7. This member 8 has been provided with two set screws 13 and 18. The set screw 13 may be used to secure the turning members 6 and 7 to be immovable with reference to each other. The set screw 18 may be used to secure the pair of turning members consisting of the turning members, locked together with the set screw 13, to be unturnable with reference to the frame 17 of the compass. The card carries two scud indexes 19, which may be displaceable, and a main steering index 15. Around the card box the scud index scale 20 has been applied. This scale is alternative, or parallel, to the displaceable or fixed scud indexes. The keel line is indicated by the index 14 on the frame portion.

The compass device is used as follows. When preparing for tacking, the vessel is turned to the wind. The tack indexes 9 and 11 are turned to bring them into a position in which the central angle between them corresponds to the vessel's most favourable angle of ascent. The tack indexes are secured to each other by means of the set screw 13. The pair of tack indexes thus formed is turned about the card box to bring the tacking index 3 of the card into the centre of the angle between the tack indexes 9 and 11. The pair of tack indexes is then secured with the set screw 18 to be unturnable with reference to the compass frame. Subsequently, tacking is performed so that on each leg the respective tack index registers with the tacking index on the card. In the event of a change in wind direction and when simultaneously the sails are kept in their most favourable position with reference to the wind, the direction of travel of the vessel will change. This is observed from the fact that the tacking index of the card comes out from under the tack index and assumes a new position, which can be read on the card division. The displacement equals the shift of the wind. Movement of the index on the card into the angle between the tack indexes indicates a wind shift in a direction more favourable for the particular tack in question, while a shift out from the angle formed by the tack indexes correspondingly signifies an unfavourable change. When sailing before the wind is concerned, the scud indexes, if these are of the displaceable kind, are positioned in accordance with the track courses; in the case that a scudding scale is used, the corresponding readings of this scale are determined. At sailing before the wind, the vessel is then steered so that the north index of the compass card registers with the respective scud index or indicates the said scud reading if the scudding scale is used. When a turnable card box is used, the scud indexes 19 are positioned consistent with the down wind runs of the track, with reference to the north index. When the vessel is on a stretch on which tacking has to be done, the vessel is pointed in the travelling direction and the card box is turned to bring the main steering index 15 into register with the north index of the card. Another possible procedure is, with the vessel in arbitrary direction, to turn the card box so that the travelling direction of the tacking stretch, as indexed on the external scale of the card box, registers with the reading index on the stationary frame component. The travelling direction is understood to mean the magnetic, or compass, bearing of the goals set for each straight run forming part of the course.

On downwind runs the vessel is steered so that the north index of the card is in register with the scud index corresponding to the particular downwind run. When sailing a track course with straight runs having positions known in advance, as for instance an international Olympic course, one may use, instead of the displaceable scud indexes, such indexes which have been fixedly entered to be consistent with the course in question and which will be automatically correctly positioned when the above-mentioned turning of the card box is carried out. The tacking stretch of the present Olympic course is as accurately to headwind as possilbe, while the downwind runs form angles of 45° with this bearing, whereby the fixed scud indexes may be provided on the compass with 135° phase shift on both sides of the main steering index. For a track conforming to an equilateral triangle, the angles between the main steering indexes and the scud indexes are 120°. With modifications, the present compass device is also usuable for distance sailing in addition to track sailing.

The invention is by no means confined merely to the embodiment example presented in the drawing; it may be modified within the scope of the invention. For instance, the tack indexes may have another shape than that of a sector. The colour of the turnable tack indexes need not necessarily be the complement of that of the tacking index on the card; it is merely essential that the tacking index of the card is clearly distinguishable from the other tack indexes. Thus, for instance, the tacking index on the card may have a pattern or shade of darkness such that it is clearly distinguished from the other tack indexes when it is not covered by these. The tacking index of the card on the compass card need by no means necessarily be in register with the north index of the card.

We claim:

1. A compass device for sailing, comprising a compass frame, a transparent card box, a guiding ring carried by said frame and surrounding said card box, said card box being rotatable within said guiding ring, a main steering index carried by said card box, a compass card extending above said card box, a tacking index carried by said card, an upper annular turning member surrounding said card box, a first tack index carried by said upper turning member, a lower annular turning member surrounding said card box, and a second tack index carried by said lower turning member, whereby said first and second tack indexes are rotatable about the center of said card box and may be so set that said tacking index will be located in the center of an angle formed by said first and second tack indexes.

2. A compass device according to claim 1, comprising at least two scud indexes carried by said card box opposite said main steering index.

3. A compass device according to claim 1, comprising means interconnecting said first and second tack indexes and firmly connecting the interconnected first and second tack indexes to said compass frame.

4. A compass device according to claim 1 comprising a reading index connected to one of said turning members and an ascent angle scale connected to the other one of said turning members.

5. A compass device according to claim 1, wherein said first and second tack indexes extend over said card box and are also sector-shaped.

6. A compass device according to claim 5, wherein said first and second tack indexes have complementary colors.

* * * * *

UNITED STATES PATENT OFFICE
CERTIFICATE OF CORRECTION

Patent No. 3,824,947                    Dated   July 23, 1974

Inventor(s)  Reijo Honkaranta et al.

It is certified that error appears in the above-identified patent and that said Letters Patent are hereby corrected as shown below:

On the cover sheet insert:

-- [30]  Foreign Application Priority Data

Finland     2036/71        July 16, 1971        --.

Signed and sealed this 29th day of October 1974.

(SEAL)
Attest:

McCOY M. GIBSON JR.                C. MARSHALL DANN
Attesting Officer                  Commissioner of Patents